United States Patent [19]

Streich et al.

[11] 4,286,629
[45] Sep. 1, 1981

[54] REMOVABLE PLUG

[75] Inventors: Steven G. Streich; Lloyd C. Knox, both of Duncan, Okla.

[73] Assignee: Halliburton Company, Duncan, Okla.

[21] Appl. No.: 101,377

[22] Filed: Dec. 7, 1979

[51] Int. Cl.³ .................. F16L 55/10; E02B 17/00
[52] U.S. Cl. ................................. 138/89; 405/203; 405/195; 166/188; 166/192
[58] Field of Search .......... 138/89, 94; 405/169, 405/224, 227, 203, 195; 166/181, 192, 135, 188

[56] References Cited

U.S. PATENT DOCUMENTS

| | | | |
|---|---|---|---|
| 3,577,737 | 4/1969 | Burleson | 138/89 X |
| 4,142,371 | 3/1979 | Mayfield et al. | 138/89 X |
| 4,144,909 | 3/1979 | Harrison | 138/89 X |
| 4,184,515 | 1/1980 | Streich et al. | 138/89 |
| 4,215,951 | 8/1980 | Knox | 405/203 |

Primary Examiner—James E. Bryant, III
Attorney, Agent, or Firm—John H. Tregoning; James R. Duzan

[57] ABSTRACT

A removable plug for the J-tube of an offshore platform or marine structure comprising a plug housing, plug body releasably retained with the plug housing, and shear type threaded fastening means retaining the plug body within the plug housing. The plug body may comprise a buoyant plug body to assist in the retrieval of the plug body after the removal thereof from the plug housing.

10 Claims, 3 Drawing Figures

REMOVABLE PLUG

This invention relates to a removable plug for J-tubes or other pipes of an offshore platform or marine structure.

A J-tube of an offshore platform or marine structure is so named from the configuration or shape that the tube assumes in the platform or structure. A J-tube of an offshore platform or marine structure usually extends from the deck area of the platform or structure to the bottom of the platform or structure and terminates adjacent the sea floor or bottom of the body of water in which the platform or structure is installed. The J-tube is normally utilized to provide a path for the future installation of flow lines, pipes, tubing, etc. running from the bottom of the offshore platform or marine structure to the deck thereof after the installation of the platform or structure.

In some instances where it is anticipated that the J-tubes will be utilized to run flow lines, pipes, tubing, etc. soon after the offshore platform or marine structure has been installed, the J-tubes are left unplugged. In other instances where it is anticipated that the J-tubes will not be utilized for a lengthy period of time after the installation of the offshore platform or marine structure, to protect the interior of the J-tubes from corrosion by the marine environment, the ends of the J-tubes are sealed until such time as a flow line, pipe, tube, etc. is to be installed therein.

In some instances where offshore platforms or marine structures are installed in shallow depths of water where the bottom of the platform or structure is readily accessible to divers, the running of flow lines, pipes, tubing, etc. in the J-tubes and the removal of any seals from the bottom of the J-tubes have generally been accomplished with few difficulties. However, with the advent of the installation of offshore platforms or marine structures in depths of water where the bottom of the platform or structure is not readily accessible to divers, it has become necessary to install flow lines, pipes, tubing, etc. through the J-tubes or to remove the seals from the ends of the J-tubes through the use of remotely controlled submersible vehicles.

To facilitate the installation of flow lines, pipes, tubing, etc. in the J-tubes of an offshore platform or marine structure and to facilitate the sealing and opening of the ends of the J-tubes adjacent the bottom of an offshore platform or marine structure, the present invention of a removable plug has been developed.

The present invention of a removable plug comprises a plug housing which is secured to the submerged end of a J-tube, a plug body installed within the plug housing, and a fastening means releasably securing the plug body within the plug housing.

The advantages of the present invention and the preferred embodiments of the present invention will be better understood from the following specification taken in conjunction with the accompanying drawings wherein.

Figure 1:
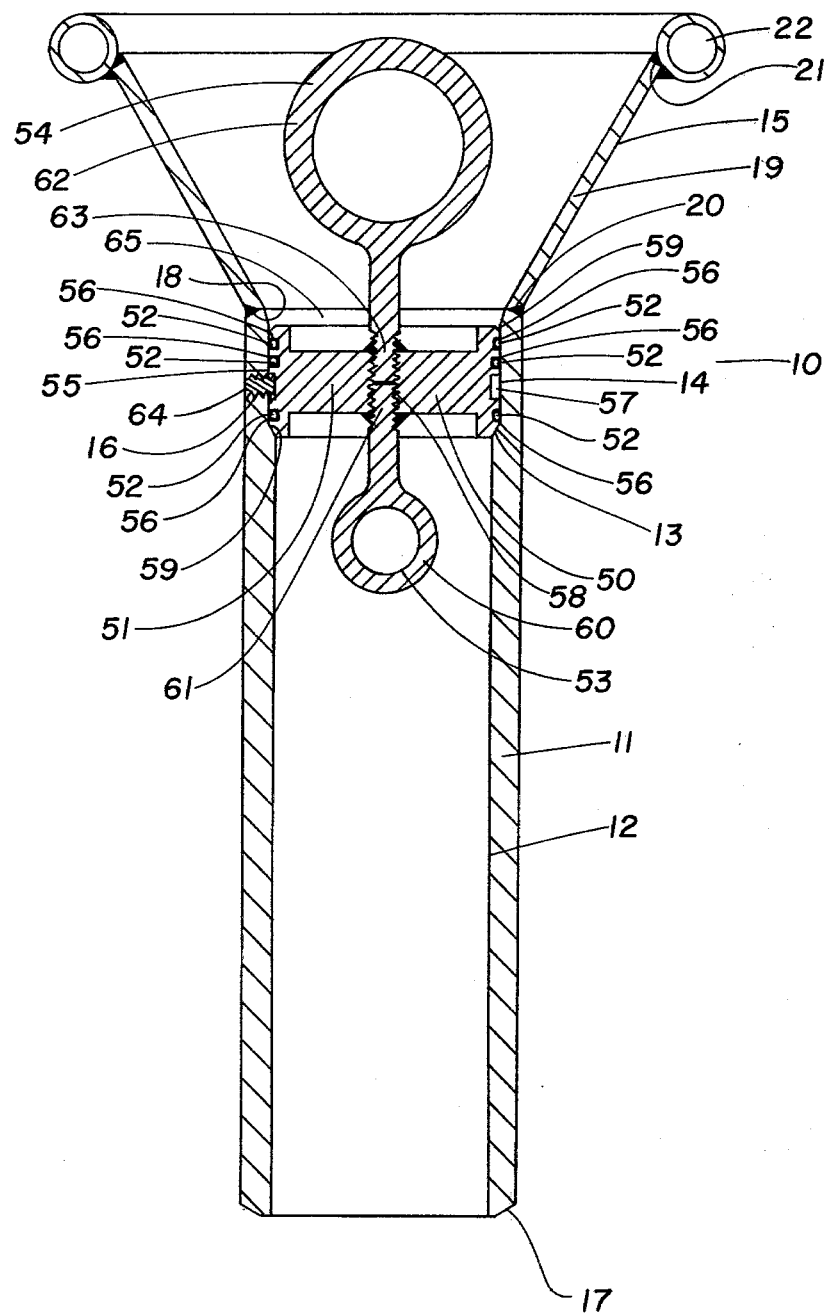
FIG. 1 is a cross-sectional view of a first preferred embodiment of the removable plug of the present invention.

Referring to FIG. 1, the first preferred embodiment of the removable plug of the present invention is shown. The removable plug 10 of the present invention comprises a plug housing 11, plug body 50 and fastening means 64.

The plug housing 11 of the removable plug 10 comprises an annular member having a first bore 12, annular chamfered seat 13, and a second bore 14 and conical guide means 15 on one thereof. Extending through the wall of the plug housing 11 in the area of the second bore 15 is one or more threaded apertures 16. The end 17 of the plug housing 11 opposite the end 18 of the plug housing 11 having conical guide means 15 thereon is chamfered to facilitate the installation of the plug housing 11 on the end of a J-tube by a suitable securing means, such as welding or by the use of a bolted flange.

The conical guide means 15 is secured to the end 18 of the plug housing 11 adjacent second bore 14 of the plug housing 11 by any suitable means, such as welding.

The conical guide means 15 comprises an annular conically shaped member 19 having one end 20 thereof, the smaller end, secured to plug housing 11 while the other end 21, the larger end, thereof is secured to an annular reinforcing means 22. The annular reinforcing means 22 may be any suitable cross-sectionally shaped annular member capable of providing reinforcement to end 21 of the conically shaped member 19.

The plug body 50 of the removable plug 10 comprises plug body means 51, seal means 52, first eyebolt attachment means 53 and second eyebolt attachment means 54.

The plug body means 51 comprises a circular member having the outer diameter 55 thereof being substantially equal to the diameter of the second bore 14 of the plug housing 11, having at least one, preferably a plurality, of annular channels 56 in the outer periphery thereof containing seal means 52 therein, having an additional annular channel 57 in the outer periphery thereof, having a centrally located threaded aperture 58 receiving a portion of first eyebolt attachment means 53 and second eyebolt attachment means 54 therein, and having annular chamfered end surfaces 59. The annular chamfered end surfaces 59 of the plug body means 51 are formed at substantially the same angle as annular chamfered surface 13 of the plug housing 11, one of which mates therewith when the plug body means 51 is installed in the plug housing 11.

The seal means 52 comprise any suitable annular elastomeric type seal means, such as an elastomeric O-ring type seal means. Any number of seal means 52 may be utilized on the plug body means 51, depending upon the degree of redundancy of sealing means desired.

The first eyebolt attachment means 53 comprises any suitable eyebolt means having a size which may be easily contained within plug housing 11 and having an eye 60 of sufficient size to receive wire rope or line therein. The threaded portion 61 of the first eyebolt attachment means 53 threadedly engages centrally located threaded aperture 58 in the plug body means 51. The first eyebolt attachment means 53 may be secured from removal from threaded aperture 58 of plug body means 51 by any suitable means, such as welding.

The second eyebolt attachment means 54 comprises any suitable eyebolt means having an eye portion 62 of sufficient size which may be easily contained within conical guide means 15, which may be easily grasped by a diver or submersible vehicle and which may receive wire rope or line therein. The threaded portion 63 of the second eyebolt attachment means 54 threadedly engages centrally located threaded aperture 58 in the plug body means 51. The second eyebolt attachment means 54 may be secured from removal from threaded aperture 58 of the plug body means 51 by any suitable means, such as welding.

The fastening means 64 comprise shear type threaded fastening means of any suitable material.

When installed in plug housing 11, the plug body 50 is installed having an annular chamfered surface 59 thereon in abutting relationship with annular chamfered surface 13 of the plug housing 11, is retained within the plug housing 11 by at least one fastening means 64 having a portion thereof threadedly engaging threaded aperture 16 in the plug housing 11 and a portion engaging annular channel 57 in the plug body means 51, and is in sealing engagement with the second bore 14 of the plug housing 11 by way of seal means 52 sealingly engaging the second bore 14.

To install the removable plug 10 on the end of a J-tube of an offshore platform or marine structure, the end 17 of plug housing 11 is secured to the end of the J-tube by any suitable means, such as welding or by the use of a bolted flange.

It should be noted that when installed on the submerged end of a J-tube of an offshore platform or marine structure installed in a marine environment, if the hydrostatic pressure of the marine environment surrounding the submerged end of the J-tube is higher than the pressure within the J-tube, the plug body 50 will have annular chamfered surface 59 thereof forced into engagement with annular chamfered surface 13 of the plug housing 11, thereby distributing the load thereacross without placing the fastening means 64 in any type of loading.

The removal of the plug body 50 from the plug housing 11 may be accomplished by either securing a line to eyebolt attachment means 54 and applying a sufficient force to the plug body 50 until fastening means 64 are sheared thereby releasing the plug body 50 from the plug housing 11 or by applying a sufficient pressure to the J-tube to which the removable plug 10 is secured until the fastening means 64 are sheared.

When installed on the submerged end of a J-tube of an offshore platform or marine structure, the eyebolt attachment means 53 of the plug body 50 will usually have a line connected thereto to facilitate the subsequent installation of a flow line, pipe, tubing, etc. through the J-tube after the plug body 50 has been removed from plug housing 11. Upon the removal and retrieval of the plug body 50 from the plug housing 11, the line attached to the eyebolt attachment means 53 of the plug body 50 may be secured to a flow line, pipe, tubing, etc. to cause the same to be installed within the J-tube by pulling it therethrough. When the flow line, pipe, tubing, etc. is being installed in the J-tube by being pulled therethrough utilizing the line which was previously attached to eyebolt attachment means 53 of plug body 50, the conical guide means 15 acts to initially guide the flow line, pipe, tubing, etc. into the plug housing 11. If desired, the juncture of the conical member 19 and end 18 of plug housing 11 may be chamfered as at 65 to provide a substantially smooth entrance into plug housing 11.

Figure 2:
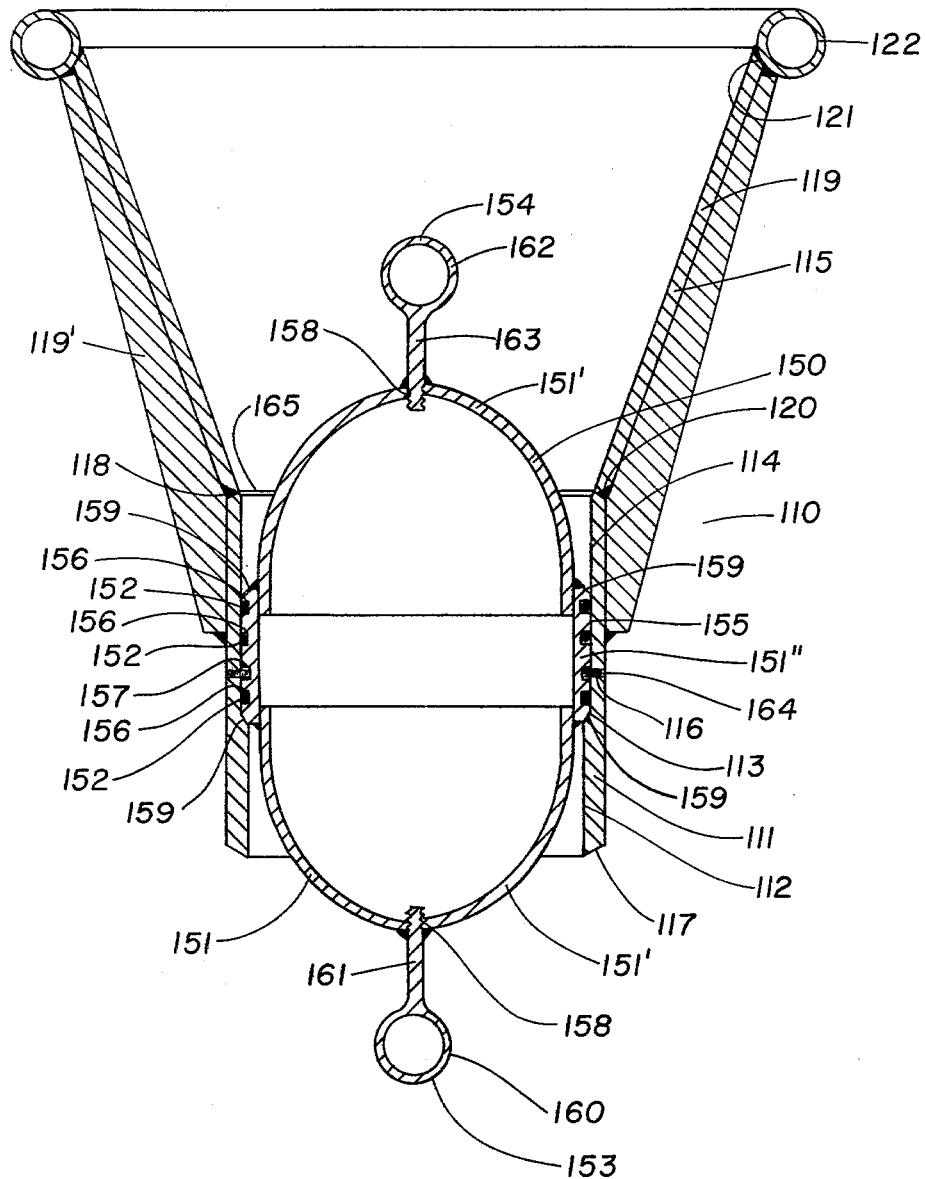
FIG. 2 is a cross-sectional view of a second preferred embodiment of the removable plug of the present invention.

Referring to FIG. 2, a second preferred embodiment of the removable plug of the present invention is shown. The preferred embodiment of the removal plug of the present invention is for use in marine environments where it is desired to have a removable plug which is buoyant to facilitate the handling of the removable plug which may have a line connected thereto. The buoyant removable plug 110 of the second preferred embodiment is similar to the removable plug 10 of the first embodiment.

The removable plug 110 comprises a plug housing 11, buoyant plug body 150 and fastening means 164.

The plug housing 111 of the removable plug 110 comprises an annular member having a first bore 112, annular chamfered seal 113, a second bore 114 and conical guide means 115 on one end thereof. Extending through the wall of the plug housing 111 in the area of the second bore 115 is at least one or more threaded apertures 116. The end 117 of the plug housing 111 opposite the end 118 of the plug housing 111 having conical guide means 115 thereon is chamfered to facilitate the installation of the plug housing 111 on the end of a J-tube by a suitable securing means, such as welding or by the use of a bolted flange.

The conical guide means 115 is secured to the end 118 of the plug housing 111 adjacent second bore 114 of the plug housing 111 by any suitable means, such as welding.

The conical guide means 115 comprises an annular conically shaped member 119 having one end 120 thereof, the smaller end, secured to plug housing 111 while the other end 121 thereof, the larger end, is secured to an annular reinforcing means 122. The annular reinforcing means 122 may be any suitable cross-sectionally shaped annular member capable of providing reinforcement to end 121 of the conically shaped member 119. If required or desired, the conically shaped member 119 may include a plurality of longitudinal reinforcing means 119' which may extend from annular reinforcing means 122 to plug housing 111 and conform to the exterior configuration of the conically shaped member 119 and plug housing 111 being secured thereto by any suitable means, such as welding. The longitudinal reinforcing means 119' may be formed from any suitable material having the desired cross-sectional shape. Alternatively, the longitudinal reinforcing means 119' may only extend along a portion of the exterior surface of conically shaped member 119.

The buoyant plug body 150 of the removable plug 110 comprises buoyant plug body means 151, seal means 152, first eyebolt attachment means 153 and second eyebolt attachment means 154.

The buoyant plug body means 151 comprises a buoyant member having the outer diameter 155 thereof being substantially equal to the diameter of the second bore 114 of the plug housing 111, having at least one, preferably a plurality, of annular channels 156 in the outer periphery thereof containing seal means 152 therein, having an additional annular channel 157 in the outer periphery thereof, having centrally threaded apertures 158 receiving portions of first eyebolt attachment means 153 and second eyebolt attachment means 154 therein, and having annular chamfered end surfaces 159. The annular chamfered end surfaces 159 of the plug body means 151 are formed at substantially the same angle as annular chamfered surface 113 of the plug housing 111, one of which mates therewith when the buoyant plug body means 151 is installed in the plug housing 111.

The buoyant plug body means 151 may be formed of any number of individual members, such as end means 151' and intermediate member 151", so long as the plug body means 151 is buoyant depending upon the marine environment in which it is to be utilized. The degree of buoyancy of the buoyant plug body means 151 may be varied depending upon the degree of force that is desired during plug body 110 retrieval operations. It should also be noted that the interior of buoyant plug body means 151 may be filled with a suitable buoyant solid material to insure that the plug body means 151 remains buoyant during service.

The seal means 152 comprise any suitable annular elastomeric type seal means, such as an elastomeric O-ring type seal means. Any number of seal means 152 may be utilized on the plug body means 151, depending upon the degree of redundancy of sealing means desired.

The first eyebolt attachment means 153 comprises any suitable eyebolt means having a size which may receive wire rope or line in the eye 160 thereof. The threaded portion 161 of the first eyebolt attachment means 153 threadedly engages threaded aperture 158 in the buoyant plug body means 151. The first eyebolt attachment means 153 may be secured from removal from threaded aperture 158 of buoyant plug body means 151 by any suitable means, such as welding.

The second eyebolt attachment means 154 comprises any suitable eyebolt means having an eye portion 162 of sufficient size which may be easily contained within conical guide means 115, which may be easily grasped by a diver or submersible vehicle and which may receive a wire rope or line therein. The threaded portion 163 of the second eyebolt attachment means 154 threadedly engages threaded aperture 158 in the buoyant plug body means 151. The second eyebolt attachment means 154 may be secured from removal from threaded aperture 158 of the buoyant plug body means 151 by any suitable means, such as welding.

The fastening means 164 comprises shear type threaded fastening means of any suitable material.

Similar to removable plug 10 of the first preferred embodiment shown in FIG. 1, the removable plug 110 as shown in FIG. 2 and described hereinabove is installed and removed in the same manner. The only difference between removable plug 10 and removable plug 110 is that during retrieval operations, the removable plug 110 provides a buoyant force which facilitates the retrieval operations, whereas removable plug 10 does not.

Figure 3:
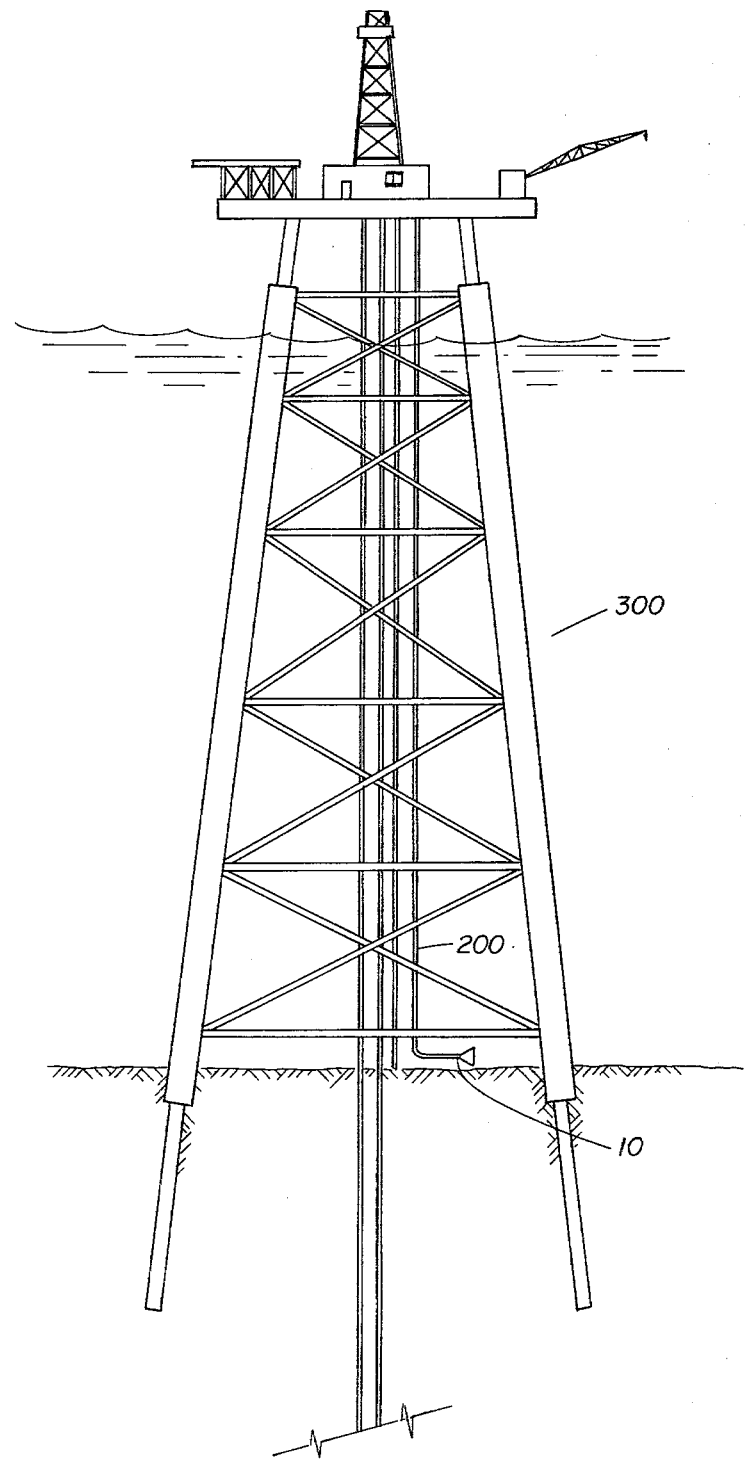
FIG. 3 is a view of an offshore platform having the removable plug of the present invention installed thereon.

Referring to FIG. 3, the removable plug 10 of the present invention is shown installed on the J-tube 200 of an offshore platform 300.

From the foregoing description it can be easily seen that the present invention offers significant advantages.

The present invention may be easily installed on the end of a J-tube during the construction of the offshore platform or marine structure.

The present invention facilitates the insertion of flow lines, pipes, tubing, etc. into the J-tube after the removal of the plug body means by providing a guide means on the end of the J-tube.

The present invention provides a means of installing a line in the J-tube which may be subsequently secured to a flow line, pipe, tubing, etc. during the installation thereof in the J-tube.

The present invention provides an attachment means by which the plug body may be grasped during removal operations of the plug body from the plug housing.

The present invention provides a means to transmit forces from the plug body to the plug housing if the external hydrostatic pressure surrounding the present invention is greater than the internal pressure of the J-tube, thereby allowing any number of fastening means to be utilized to retain the plug body in the plug housing.

The present invention provides a plug body which is buoyant to facilitate the retrieval of the plug body after the removal thereof from the plug housing.

The present invention is simple to construct.

It should be noted that although the present invention has been described in connection with a J-tube of an offshore platform or marine structure, it can be utilized in any environment to provide a closure means for a pipe, tube, flow line, etc.

Additionally, while most conveniently constructed having a circular annular housing and circular plug body, the removable plug may be any geometric shape.

Having thus described my invention, I claim:

1. A removable plug installed on one end of a pipe comprising:
    plug housing means comprising:
        annular member means having one end thereof secured on one end of said pipe, having first bore means extending from the end of the annular member means secured to one end of said pipe and terminating at a point intermediate the ends of the annular member means, having annular chamfered seat means at the termination of the first bore means, having second bore means extending from the annular chamfered seat means to the other end of the annular member means, having aperture means in the second bore means of the annular member means, and having conical guide means on the other end of the annular member means;
    plug body means retained within said plug housing means, said plug body means comprising:
        member means having the outer diameter thereof substantially the same diameter as the second bore means of said plug housing, having annular channel means in the outer periphery thereof containing seal means therein, having additional annular channel means in the outer periphery thereof, having aperture means therein, having attachment means retained within the aperture means extending on each side of said plug body means, and having annular chamfered seat means thereon which mates with the annular chamfered seat means of said plug housing means when said plug body means is installed therein; and
    fastening means releasably retaining said plug body means within said plug housing means, said fastening means comprising:
        shear type fastening means having a portion thereof retained within the aperture means in the second bore of said plug housing means and having a portion received within the additional annular channel means of said plug body means when said plug body means is installed in said plug housing means.

2. The removable plug of claim 1 wherein the conical guide means contains annular reinforcing means on one end thereof.

3. The removable plug of claim 1 wherein said plug body means comprises buoyant plug body means including end means interconnected by intermediate member means extending therebetween thereby forming a buoyant plug body means having a chamber therein.

4. The removable plug of claim 1 wherein said plug housing means further comprises:
reinforcing means reinforcing the annular member means and the conical guide means thereon of said plug housing means.

5. The removable plug of claim 4 wherein the reinforcing means comprise longitudinal reinforcing means.

6. The removable plug of claim 1 wherein said pipe comprises a J-tube of an offshore platform or marine structure.

7. The removable plug of claim 1 wherein the seal means comprise annular elastomeric seal means.

8. The removable plug of claim 7 wherein the seal means comprise annular elastomeric annular O-ring type seal means.

9. A removable plug installed on one end of a J-tube of an offshore platform or marine structure comprising:
plug housing means, said plug housing means comprising:
annular member means having first bore means extending from the end of the annular member means secured to one end of said end of a J-tube and terminating at a point intermediate the ends of the annular member means, having annular chamfered seat means at the termination of the first bore means, having second bore means extending from the annular chamfered seat means, to the other end of the annular member means, having aperture means in the second bore means of the annular member means, and having conical guide means on the other end of the annular member means;
plug body means retained within said plug housing means, said plug body means comprising:
member means having the outer diameter thereof substantially the same diameter as the second bore means of said plug housing means, having annular channel means in the outer periphery thereof containing seal means therein, having additional channel means in the outer periphery thereof, having aperture means therein, having attachment means retained within the aperture means extending on each side of said plug body means, and having annular chamfered seat thereon which mate with the annular chamfered seat means of said plug housing means when said plug body means is installed therein; and
fastening means releasably retaining said plug body means within said plug housing means, said fastening means comprising:
shear type fastening means having a portion thereof received within the aperture means of the second bore of said plug housing means and having a portion thereof received within the additional channel means of said plug body means when said plug body means is installed within said plug housing means.

10. A removable plug installed on one end of a J-tube of an offshore platform or marine structure comprising:
plug housing means, said plug housing means comprising:
annular member means having first bore means extending from the end of the annular member means secured to one end of said end of a J-tube and terminating at a point intermediate the ends of the annular member means, having annular chamfered seat means at the termination of the first bore means, having second bore means extending from the annular chamfered seat means to the other end of the annular member means, and having conical guide means on the other end of the annular member means;
buoyant plug body means retained within said plug housing means, said buoyant plug body means comprising:
buoyant member means including end means interconnected by intermediate member means extending therebetween thereby forming a buoyant member means having a fluid free buoyant chamber therein, the buoyant member means having the outer diameter thereof substantially the same diameter as the second bore means of said plug housing, having annular channel means in the outer periphery thereof containing seal means therein, having additional channel means in the outer periphery thereof, having aperture means therein, having attachment means retained within the aperture means extending on each side of said buoyant plug body means, and having annular chamfered seat means thereon which mate with the annular chamfered seat means of said plug housing means when said buoyant plug body means is installed therein; and
fastening means releasably retaining said buoyant plug body means within said plug housing means, said fastening means comprising:
shear type fastening means having a portion thereof received within the aperture means of the second bore of said plug housing means and having a portion thereof received within the additional channel means of said buoyant plug body means when said buoyant plug body means is installed within said plug housing means.

* * * * *